(12) United States Patent
Wakamatsu

(10) Patent No.: US 6,466,553 B1
(45) Date of Patent: Oct. 15, 2002

(54) RECEIVER, INTERMITTENT FRAME SYNCHRONIZING METHOD AND PORTABLE REMOTE TERMINAL

(75) Inventor: Shunichi Wakamatsu, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/192,538

(22) Filed: Nov. 17, 1998

(30) Foreign Application Priority Data

Nov. 19, 1997 (JP) .............................................. 9-317914
Nov. 9, 1998 (JP) ........................................... 10-317478

(51) Int. Cl.[7] .............................................. H04B 1/38
(52) U.S. Cl. ...................... 370/311; 370/311; 455/343; 455/334; 455/572
(58) Field of Search ................................ 370/310, 311, 370/357; 455/343, 88, 334, 255, 571, 572, 573, 574, 575

(56) References Cited

U.S. PATENT DOCUMENTS

| | | | | |
|---|---|---|---|---|
| 4,903,319 A | * | 2/1990 | Kasai et al. ................... | 455/33 |
| 4,977,611 A | * | 12/1990 | Maru .......................... | 455/161 |
| 5,140,698 A | * | 8/1992 | Toko ........................... | 455/76 |
| 5,428,820 A | | 6/1995 | Okada et al. .............. | 455/38.3 |
| 5,765,104 A | * | 6/1998 | Kushita ...................... | 455/343 |
| 6,009,319 A | * | 12/1999 | Khullar et al. .............. | 455/343 |

* cited by examiner

Primary Examiner—Hassan Kizou
Assistant Examiner—Anh-Vu H Ly
(74) Attorney, Agent, or Firm—Jacobson Holman, PLLC

(57) ABSTRACT

The present invention includes a receiver, an intermittent frame synchronizing method and a portable remote terminal which can reduce power consumption and cost, while the accuracy of generation of intermittent reception timings is maintained. For example, in the receiver, the intermittent frame synchronizing method and the portable remote terminal, averaging member, in which separate values are set in two decoders, divides clock signals transmitted from slow clock generating member as a time measuring clock with separate periods, and averages the clock signals to output slot timing signals. The slot timing signals are counted by a saving counter, which outputs a coincidence signal when the constant value is reached. Upon receiving the coincidence signal, receiving member performs reception.

13 Claims, 5 Drawing Sheets

RECEIVER, INTERMITTENT FRAME SYNCHRONIZING METHOD AND PORTABLE REMOTE TERMINAL

BACKGROUND OF THE INVENTION

1. Field of the Invention

The present invention relates to a receiver for use in a cellular phone or the like, an intermittent frame synchronizing method and a portable remote terminal using the receiver and the method, particularly to a receiver, an intermittent frame synchronizing method and a portable remote terminal which can reduce power consumption and cost.

2. Description of the Related Art

Recently, a cellular phone and a mobile radio communicator such as a pager have been provided with a clock function, a telephone directory function and other high level functions.

On the other hand, in order to realize a long time use with a battery with a limited capacity, power consumption is reduced in various methods. Such method for reducing the power consumption is called battery saving.

For example, at a time of waiting, the battery saving is realized by supplying no power to a receiver at times other than a time when a signal is transmitted from a base station or by other measures. The method of battery saving at the time of waiting has been developed by noting that the signal transmitted from the base station is divided into time units called frames, and is also referred to as "the intermittent frame synchronizing method".

In the conventional intermittent frame synchronizing method, an exclusive crystal oscillator is used to generate a clock, and a time when the frame to be received reaches (intermittent reception timing) is detected based on the signal of the clock.

Moreover, in some conventional portable radiophone, a sleep period during which no paging information is received from a remote transceiver is calculated based on a low frequency oscillator and the previous received timing information in the control mode. During the sleep period, a part of the device is shut down, and the power consumption is reduced by intermittently receiving the paging information from the remote transceiver (Japanese Patent Application Publication No. 504075/1996).

In the conventional intermittent frame synchronizing method, however, the crystal oscillator exclusive for generating the intermittent timing clock is necessary. When crystal oscillators for MPU and a clock function are included, three crystal oscillators are used in total, which adds to cost. The mobile radio communicator cannot be miniaturized. Moreover, especially when the interval between the frames to be received is long, a high accuracy is requested for. Furthermore, when the clock operates at a high speed, the power consumption cannot be sufficiently reduced.

SUMMARY OF THE INVENTION

An object of the present invention is to provide a receiver, an intermittent frame synchronizing method and a portable remote terminal which can reduce power consumption and further cost while maintaining the accuracy of generation of an intermittent reception timing.

The present invention provides a receiver which comprises a slow clock generating means for outputting clock signals; an averaging means for dividing the clock signals transmitted from the slow clock generating means with separate periods, averaging the divided clock signals and outputting a slot timing signal to form a pulse signal which rises once in one slot time; a saving counter for incrementing the counted value every time the slot timing signal is received, and outputting a coincidence signal indicative of coincidence when the counted value coincides with the preset value; and a receiving means for performing reception only for one slot time after the coincidence signal is received, so that the power consumption and cost can be reduced, while the accuracy of the intermittent reception timing can be maintained.

According to the present invention, in the above-mentioned receiver, the averaging means comprises a slot counter for incrementing the counted value every time the clock signal is received from the slow clock generating means; a first decoder for comparing the counted value of the slot counter with the first preset value and outputting a pulse signal indicative of coincidence upon coincidence; a second decoder for comparing the counted value of the slot counter with the second preset value and outputting a pulse signal indicative of coincidence upon coincidence; and a selector for alternately selecting the pulse signals transmitted by the first and second decoders and transmitting to the outside a slot timing signal to form a pulse signal which rises once in one slot time, so that the power consumption and cost can be reduced, while the accuracy of the intermittent reception timing can be maintained.

According to the present invention, the receiver is provided with a time measuring clock, and the slow clock generating means corresponds to the time measuring clock, so that the power consumption and cost can be reduced, while the accuracy of the intermittent reception timing can be maintained.

The present invention provides an intermittent frame synchronizing method which comprises the steps of dividing clock signals transmitted from a time measuring clock with separate periods, averaging the divided clock signals, generating slot timing signals to form one pulse signal per slot time, counting the slot timing signals, and performing reception only for one slot time every time the preset constant number is reached, so that the power consumption and cost can be reduced, while the accuracy of the intermittent reception timing can be maintained.

The present invention also provides a receiver which comprises a slow clock generating means for outputting clock signals; an averaging means for generating slot timing signals from the clock signals to form a pulse signal which rises once in one slot time; a saving counter for counting the slot timing signals and outputting a coincidence signal when the preset value is counted; a receiving means for performing reception only for one slot time after the coincidence signal is outputted; a control means provided with MPU which is stopped when there is no processing to be performed and restarts processing upon receiving an interrupt signal, and outputting a rapid clock control signal for stopping the generation of a rapid clock when the MPU is stopped; a delay circuit for transmitting the interrupt signal to the MPU when the preset constant time elapses after the coincidence signal is received from the saving counter; and a rapid clock generating means for receiving the rapid clock control signal for stopping the generation of the rapid clock to stop the generation of the rapid clock and receiving the coincidence signal from the saving counter to start the generation of the rapid clock, so that the power consumption and cost can be reduced, while the accuracy of the intermittent reception timing can be maintained.

The present invention provides a portable remote terminal which comprises a receiver for receiving a radio signal and demodulating the radio signal to a digital signal; a transmitter for modulating the digital signal to transmit the radio signal; a controller for processing the digital signal; a voice processor for performing conversion of the digital signal and a voice signal; a voice output section for outputting a voice; and a voice input section for inputting the voice. The receiver is provided by the present invention as aforementioned. The clock signal for realizing battery saving can be shared with other clock signals, so that the power consumption and cost can be reduced. Moreover, by using the averaging means, the accuracy of the intermittent reception timing can be maintained.

The present invention also provides a portable remote terminal which comprises a receiver for receiving a radio signal and demodulating the radio signal to a digital signal; a transmitter for modulating the digital signal to transmit the radio signal; a controller for processing the digital signal; a voice processor for performing conversion of the digital signal and a voice signal; a voice output section for outputting a voice; and a voice input section for inputting the voice. The receiver is provided by the present invention as aforementioned. In the portable remote terminal, the clock signal for realizing battery saving can be shared with other clock signals, so that the power consumption and cost can be reduced. Moreover, by averaging the clock signals divided with separate periods, the accuracy of the intermittent reception timing can be improved.

The present invention further provides a portable remote terminal which comprises a receiver for receiving a radio signal and demodulating the radio signal to a digital signal; a transmitter for modulating the digital signal to transmit the radio signal; a controller for processing the digital signal; a voice processor for performing conversion of the digital signal and a voice signal; a voice output section for outputting a voice; and a voice input section for inputting the voice. The receiver is provided by the present invention as aforementioned. The clock signal for realizing battery saving can be shared with a time measuring clock signal, so that the power consumption and cost can be reduced, while the accuracy of the intermittent reception timing can be maintained.

The present invention provides a portable remote terminal which comprises a receiver for receiving a radio signal and demodulating the radio signal to a digital signal; a transmitter for modulating the digital signal to transmit the radio signal; a controller for processing the digital signal; a voice processor for performing conversion of the digital signal and a voice signal; a voice output section for outputting a voice; and a voice input section for inputting the voice. The receiver is provided by the present invention as aforementioned. The clock signal for realizing battery saving can be shared with other clock signals. Moreover, while there is no processing to be performed, the supply of the clock signal to MPU can be stopped, so that the power consumption and cost can be reduced. By using the averaging means, the accuracy of the intermittent reception timing can be maintained.

The present invention provides a receiver which comprises a slow clock generating means for outputting clock signals; an averaging means for generating slot timing signals from the clock signals to form a pulse signal which rises once in one slot time; a saving counter for counting the slot timing signals and outputting a coincidence signal when the preset value is counted; a receiving means for performing reception only for the preset one slot time after the coincidence signal is outputted; a control means provided with MPU which is stopped when there is no processing to be performed and restarts processing upon receiving an interrupt signal, and outputting a rapid clock control signal for stopping the generation of a rapid clock when the MPU is stopped; a delay circuit for transmitting the interrupt signal to the MPU when the preset constant time elapses after the coincidence signal is received from the saving counter; and a rapid clock generating means for receiving the rapid clock control signal for stopping the generation of the rapid clock to stop the generation of the rapid clock and receiving the coincidence signal from the saving counter to start the generation of the rapid clock. The averaging means comprises a slot counter for incrementing the counted value every time the clock signal is received from the slow clock generating means; a first decoder for comparing the counted value of the slot counter with the first preset value and outputting a pulse signal indicative of coincidence upon coincidence; a second decoder for comparing the counted value of the slot counter with the second preset value and outputting a pulse signal indicative of coincidence upon coincidence; and a selector for alternately selecting the pulse signals transmitted by the first and second decoders and transmitting to the outside the slot timing signal to form the pulse signal which rises once in one slot time. The receiving means comprises a SW detector for detecting a sync word from the received signal and outputting a pulse signal indicating that the sync word is detected; and a slot counter for receiving the pulse signal from the SW detector and measuring the preset one slot time before outputting an end timing signal. The clock signal for realizing battery saving can be shared with other clock signals. Moreover, while there is no processing to be performed, the supply of the clock signal to MPU can be stopped, so that the power consumption and cost can be reduced. Furthermore, by averaging the clock signals divided with separate periods, the accuracy of the intermittent reception timing can be enhanced.

The receiver of the present invention comprises a plurality of SW detectors corresponding to a plurality of communication systems.

The control means comprises a storage section for storing sets of data to be set in the first decoder, the second decoder, the saving counter and the slot counter corresponding to the plurality of communication systems. The MPU refers to the storage section based on a signal transmitted from the outside for selecting the communication system to select the set of data corresponding to the selected communication system, sets the data contained in the set to the first decoder, the second decoder, the saving counter and the slot counter, and selects and operates the SW detector corresponding to the selected communication system from the plurality of SW detectors. By generating the intermittent reception timing corresponding to the communication system selected from the plurality of communication systems, signals of the plurality of communication systems can be intermittently received by one receiver, so that the power consumption and cost can be reduced, while handiness can further be enhanced.

The present invention provides a portable remote terminal which comprises a receiver for receiving a radio signal and demodulating the radio signal to a digital signal; a transmitter for modulating the digital signal to transmit the radio signal; a controller for processing the digital signal; a voice processor for performing conversion of the digital signal and a voice signal; a voice output section for outputting a voice; and a voice input section for inputting the voice. The receiver is provided by the present invention as aforementioned. In the portable remote terminal, by generating an intermittent reception timing corresponding to the communication system selected from a plurality of communication systems, signals of the plurality of communication systems can be intermittently received by one receiver, so that the power consumption and cost can be reduced, while handiness can further be enhanced.

In the portable remote terminal of the present invention, the plurality of communication systems include a personal digital cellular system and a personal handy phone system. Signals of both PDC and PHS systems can be intermittently received with one portable remote terminal, so that the power consumption and cost can be reduced, while handiness can further be enhanced.

DESCRIPTION OF REFERENCE NUMERALS

1 . . . slow clock generating means, 2 . . . averaging means, 3 . . . slot counter, 4 . . . receiving means, 5 . . . control means, 6 . . . first OR gate, 7 . . . second OR gate, 8 . . . delay circuit, 9 . . . rapid clock generating means, 10 . . . antenna, 11 . . . receiver, 12 . . . controller, 13 . . . voice signal processor, 14 . . . microphone, 15 . . . speaker, 16 . . . transmitter, 17 . . . key input section, 18 . . . storage section, 21 . . . slot counter, 22 . . . decoder, 23 . . . selector, 41 . . . SW detector, 41$a$ . . . PDC SW detector, 41$b$ . . . PHS SW detector, 42. . . slot counter, 51 . . . MPU, 52 . . . clear register, 53 . . . NAND circuit, 54 . . . flip-flop circuit, 91 . . . NAND circuit, 92 . . . crystal oscillator, 93 . . . NOR circuit

DESCRIPTION OF THE PREFERRED EMBODIMENT

Embodiments of the present invention will be described with reference to the accompanying drawings.

In a receiver and an intermittent frame synchronizing system according to the first embodiment of the present invention, for example, a slow clock signal for measuring time is used to generate an intermittent reception timing, and the operation of intermittent reception is performed, so that the power consumption and cost can be reduced. Furthermore, by using the averaging means, the accuracy of the intermittent reception timing is maintained.

Figure 1:
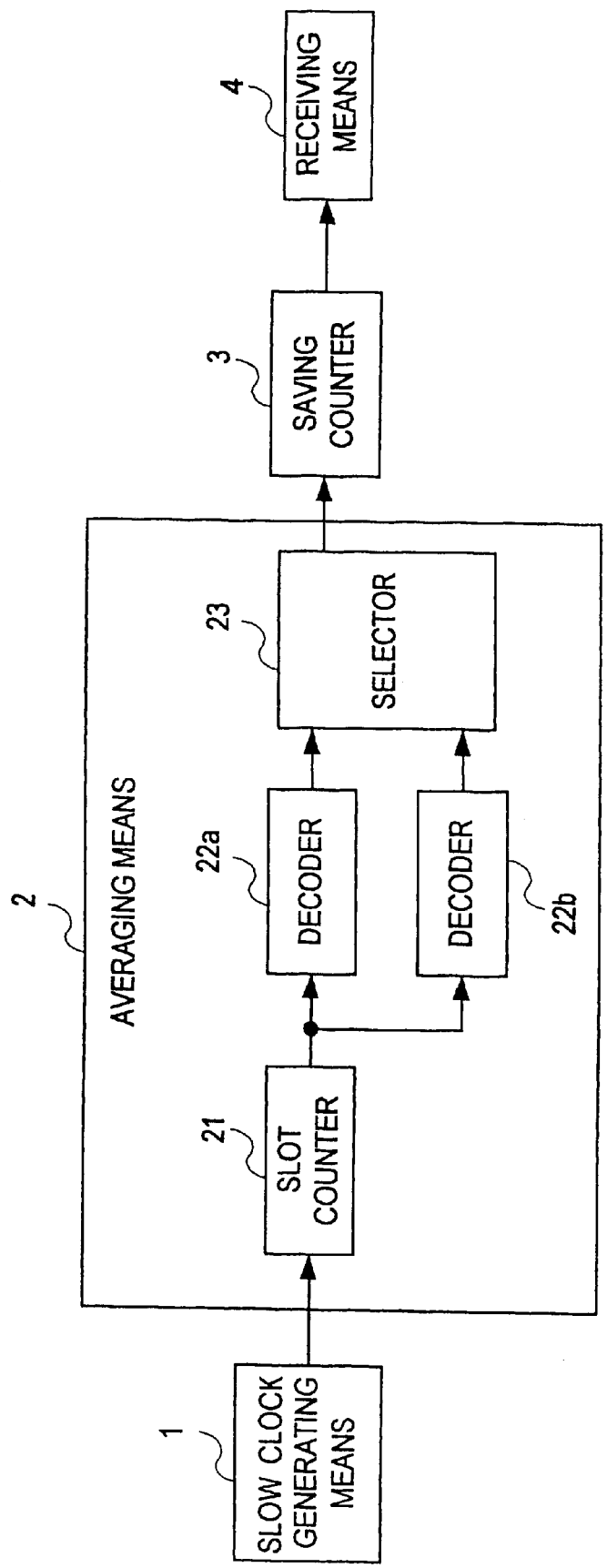
FIG. 1 is a block diagram showing the structure of a receiver according to the first embodiment of the present invention.

The receiver according to the first embodiment of the present invention (the first present receiver) will be described referring to FIG. 1. FIG. 1 is a block diagram showing the structure of the first present receiver.

The first present receiver, as shown in FIG. 1, mainly comprises a slow clock generating means 1, an averaging means 2, a saving counter 3 and a receiving means 4.

Each component will now be described in detail.

The slow clock generating means 1 generates and outputs a slow clock signal of around 32 kHz. Specifically, a time measuring clock (having an oscillation frequency of 32.768 kHz) is used as a slow clock. However, the slow clock generating means 1 is not limited to this, and may be of any type as long as its generated frequency is lower than the frequency of a rapid clock as the reference clock of the device.

The averaging means 2 receives the clock signal from the slow clock generating means 1, performs frequency dividing and averaging, and outputs one pulse signal per slot time.

The pulse signal is hereinafter referred to as "the slot timing signal".

Additionally, details of the averaging means 2 will be described later in detail.

The saving counter 3 increments the counted value every time the slot timing signal is received from the averaging means 2.

Moreover, the saving counter 3 outputs a signal indicative of coincidence (coincidence signal), when the counted value coincides with the preset value.

The receiving means 4 is started upon receiving the coincidence signal to perform reception.

Here, the averaging means 2 will be described in more detail. As shown in FIG. 1, the averaging means 2 basically comprises a slot counter 21, a first decoder 22$a$, a second decoder 22$b$, and a selector 23.

Each component of the averaging means 2 will be described. Upon receiving the clock signal from the slow clock generating means 1, the slot counter 21 increments and outputs the counted value, and resets the counted value when one slot time is counted.

Specifically, if the signal of 32.768 kHz is used as the slow clock signal, the slot counter 21 increments the counted value every $1/32768$ second.

Upon receiving the counted value from the slot counter 21, the first decoder 22$a$ compares the counted value with the preset decoder value (first decoder value), and outputs a pulse signal indicative of coincidence when the counted value coincides with the decoder value.

Upon receiving the counted value from the slot counter 21, the second decoder 22$b$ compares the counted value with the preset decoder value (second decoder value), and outputs a pulse signal indicative of coincidence when the counted value coincides with the decoder value.

As described later, the first and second decoder values are usually different from each other.

Specifically, the first and second decoders 22 divide the received clock signals with different periods.

Upon receiving the pulse signals from the first and second decoders 22, the selector 23 alternately selects and outputs the pulse signals as the slot timing signals.

Specifically, the selector 23 averages the clock signals divided by the first and second decoders 22.

The decoder values to be set in the first and second decoders 22 are determined as follows. Additionally, in the following description, it is assumed that the slow clock generating means 1 outputs the clock signal of 32.768 kHz and that the first present receiver is applied to PDC (Personal Digital Cellular) system.

In PDC system, one slot per 108 slots is received.

Specifically, a super frame is provided with 108 slots.

Moreover, in PDC system, since one super frame is received in a time of 720 millisecond (ms), time per slot is 720/108 ms, i.e., about 6.67 ms.

When a hexadecimal numeral "DAh"0 is used as the decoder value, i.e., when the value is a decimal numeral "218", the decoder 22 outputs the pulse signal at a time represented in the following expression (1):

$$t_a = DAh \times 1/132768 = 6.652832 \text{ ms} \quad (1)$$

Moreover, when a hexadecimal numeral "DBh", i.e., a decimal numeral "219" is set as the decoder value, the decoder outputs the pulse signal at a time represented in the following expression (2):

$$t_b = DBh \times 1/32768 = 6.683349 \text{ ms} \quad (2)$$

When the hexadecimal numeral "DAh" is set as the first decoder value in the first decoder 22a, the hexadecimal numeral "DBh" is set as the second decoder value in the second decoder 22b, and the values are alternately selected by the selector 23, the times represented in the expressions (1) and (2) at which the pulse signals are outputted are averaged, and only a deviation of about several microseconds (ps) occurs as shown in the following expression (3). The time is about 3 symbols.

$$720 - (108 \times (t_a + t_b)/2) = 720 - (108 - (DAh + DBh)/(2 \times 32768)) \times 1000 = 153.8 \text{ }\mu\text{sec} \quad (3)$$

The operation of the first present receiver will next be described.

The slow clock signals transmitted from the slow clock generating means 1 are averaged by the averaging means 2, and outputted as the slot timing signals.

Then, every time the slot timing signal is received, the saving counter 3 increments the counted value, and outputs a coincidence signal when the counted value coincides with the preset value.

Here, the value preset in the saving counter 3 is the number of slots per super frame, and "108" in the above PDC example. Specifically, the coincidence signal is a pulse signal which rises once per 108 slots, and indicates an intermittent reception timing.

Subsequently, upon receiving the coincidence signal from the saving counter 3, the receiving means 4 is started to perform reception.

According to the first present receiver, for example, a time measuring slow clock is used to generate the intermittent reception timing. By performing intermittent frame synchronization by the timing, battery saving is achieved, so that the power consumption and cost can effectively be reduced.

Moreover, by appropriately changing the decoder values set in two decoders of the averaging means, the receiver can effectively be applied to various digital communication systems. Furthermore, by increasing the number of decoders of the averaging means, a more accurate intermittent reception timing can be generated.

Additionally, the receiving means 4 essentially needs to be started slightly earlier before performing reception in order to set a reception frequency.

To solve the problem, the first present receiver may be provided with control means, in order that the decoder values set in two decoders 22 of the averaging means 2 are adjusted slightly smaller.

Moreover, a receiver according to the second embodiment of the present invention is based on the receiver according to the first embodiment, in which intermittent reception is realized without using an exclusive crystal oscillator. Additionally, when the control means for controlling the receiver performs no processing, the generation of the clock signal to be supplied to the control means is temporarily stopped, so that the power consumption and manufacture cost can be reduced.

Figure 2:
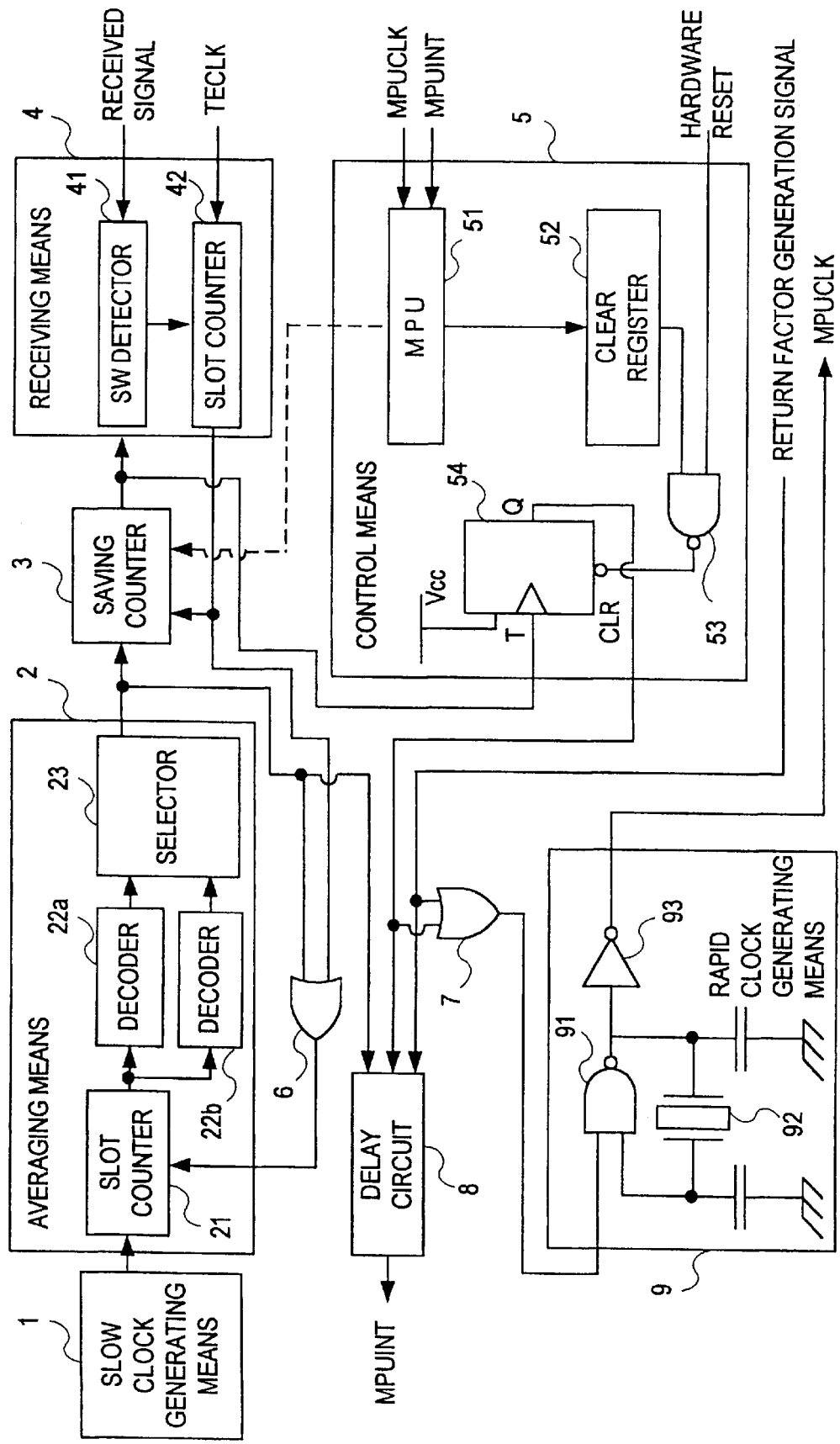
FIG. 2 is a block diagram showing the structure of a receiver according to the second embodiment of the present invention.

The receiver according to the second embodiment of the present invention (second present receiver), as shown in FIG. 2, mainly comprises a slow clock generating means 1, an averaging means 2, a saving counter 3, a receiving means 4, a control means 5, a first OR gate 6, a second OR gate 7, a delay circuit 8, and a rapid clock generating means 9. FIG. 2 is a block diagram showing the structure of the second present receiver.

Each component will be hereinafter described. Since the slow clock generating means 1 and the saving counter 3 are the same as those of the already described first present receiver, the description thereof is omitted.

The slow clock generating means 1 generates a lower frequency than the rapid clock generating means.

Moreover, the averaging means 2 is substantially the same as the averaging means 2 of the first present receiver, but slightly different therefrom in that when a reset signal is received from the first OR gate 6 described later, the slot counter 21 and the saving counter 3 set counted values to "0" (reset the values).

Additionally, the value set in the saving counter 3 is set when a signal is received from MPU 51 of the control means 5 described later.

Upon receiving the coincidence signal indicative of intermittent reception timing from the saving counter 3, the receiving means 4 is started to perform reception.

Specifically, the receiving means 4 comprises SW detector 41 for detecting a sync word (hereinafter abbreviated as "SW") from the received signal to output a signal indicating that SW is detected. The receiving means 4 receives signals only for one slot time after SW is detected.

The receiving means 4 also comprises a slot counter 42 which measures the one slot time after the signal indicating that SW is detected is received from SW detector 41 and which outputs an end timing signal indicating that reception is completed when one slot time elapses after SW is detected.

Here, the slot counter 42 may measure one slot time by counting symbol clocks TECLK transmitted from the outside. Additionally, the symbol clock may be the clock signal itself transmitted from the slow clock generating means 1.

The control means 5 comprises MPU 51 which receives a rapid clock signal MPUCLK from the rapid clock generating means 9 described later to operate, a clear register 52, NAND circuit 53, and a flip-flop circuit 54 to control the present receiver.

Moreover, the control means 5 receives the coincidence signal from the saving counter 3 or a reset signal from the outside to output a signal (rapid clock control signal) for controlling the start or stop of the clock signal to be transmitted to MPU 51.

Each component of the control means 5 will now be described.

The MPU 51 periodically outputs an instruction (stop order) to stop the control means 5, and is stopped.

Furthermore, MPU 51 receives an interrupt signal MPUINT from the outside to restart operation.

The clear register 52 outputs a reset signal when a constant time elapses after the stop order is received from MPU 51.

Specifically, the clear register 52 usually outputs a signal of "1", and becomes "0" when outputting the reset signal.

The NAND circuit 53 calculates the logical product of the signal transmitted from the clear register 52 and the signal transmitted from the outside, and logically reverses and outputs the calculation result.

Here, the signal transmitted from the outside is usually "1", but becomes "0" when hardware reset is performed.

Therefore, the signal outputted from NAND circuit 53 is usually "0", and becomes "1" when the reset signal is received from the clear register 52 or when the hardware reset signal is received.

Moreover, an input terminal T of the flip-flop circuit 54 is connected to the saving counter 3, and a clear terminal CLR is a reverse input terminal which receives the reverse input of the signal from NAND circuit 53. Furthermore, the signal outputted from an output terminal Q of the flip-flop circuit 54 becomes a rapid clock control signal as it is.

Therefore, the flip-flop circuit 54 outputs the rapid clock control signal of "0" via the output terminal Q while NAND circuit 53 outputs "1", and reverses the rapid clock control signal at a time when the coincidence signal rises while NAND circuit 53 outputs "0".

By calculating the logical sum of the end timing signal transmitted from the slot counter 42 of the receiving means 4 and the slot timing signal transmitted from the averaging means 2, the first OR gate 6 transmits a reset signal to the slot counter 21 of the averaging means 2 when either of the signals becomes "1".

The second OR gate 7 calculates the logical sum of the rapid clock control signal transmitted from the control means 5 and a signal (return factor generation signal) transmitted from the outside for indicating that a factor is generated to start the operation of MPU 51. The calculation result is transmitted as a switch signal to the rapid clock generating means 9. The return factor generation signal includes a key input signal.

The delay circuit 8 transmits an interrupt signal MPUINT to MPU 51 of the control means 5 when a constant time elapses after the rapid clock control signal of "1" is received from the control means 5 or after the return factor generation signal is transmitted from the outside.

Here, the delay circuit waits for the constant time to elapse, because the time until the clock generated by the rapid clock generating means 9 described later is stabilized is considered.

Specifically, the above-mentioned constant time is considered to be one slot time. In this case, when the rapid clock control signal of "1" or the return factor generation signal are received, the delay circuit may not output the interrupt signal until the next slot timing signal is transmitted from the averaging means 2.

Upon receiving the switch signal from the second OR gate 7, the rapid clock generating means 9 generates a rapid clock to supply the rapid clock to MPU 51 of the control means 5 when the switch signal is "1", and stops the generation of the rapid clock when the switch signal is "0".

Specifically, the rapid clock generating means 9 comprises NAND circuit 91, a rapid clock crystal oscillator (X' tal) 92, two capacitors, and an inverter 93.

The NAND circuit 91 have two inputs: one input terminal is connected to one end of the crystal oscillator 92 and the other input terminal is connected to the output terminal of the second OR gate 7.

Moreover, the other end of the crystal oscillator 92 is connected to the output terminal of NAND circuit 91.

The terminals of the crystal oscillator 92 are grounded via the capacitors.

The inverter 93 reverses the signal outputted from NAND circuit 91 to transmit a rapid clock signal MPUCLK to the outside.

Specifically, while the switch signal of "1" is transmitted to the rapid clock generating means 9 from the second OR gate 7, the output of NAND circuit 91 is obtained by reversing the clock signal generated by the crystal oscillator 92. The inverter 93 reverses the signal outputted from NAND circuit 91 to output the rapid clock signal.

Figure 3:
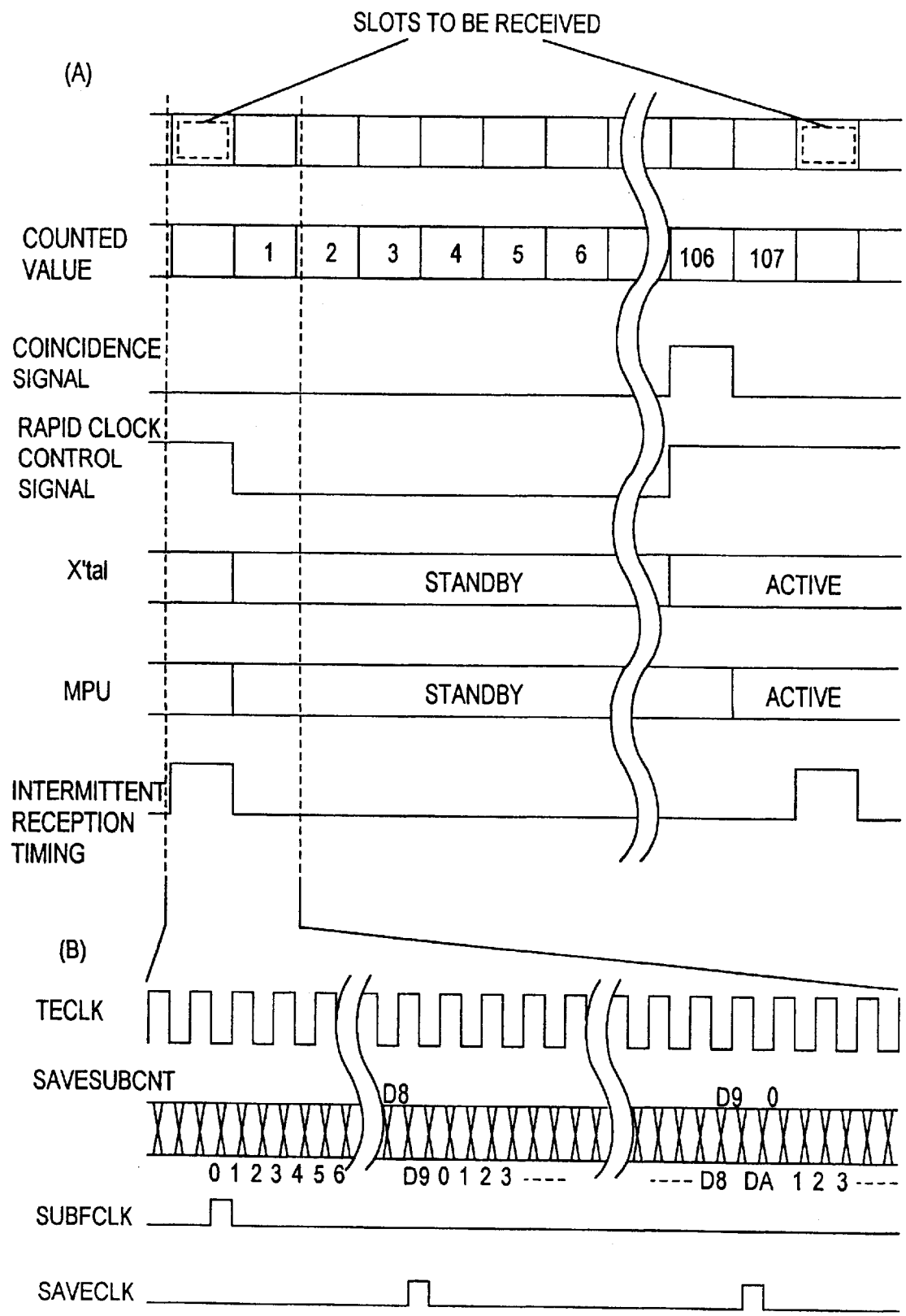
FIG. 3A is a timing chart showing the operation of the receiver according to the second embodiment of the present invention.
FIG. 3B is a timing chart in which one slot time of the timing chart shown in FIG. 3A is enlarged.

The operation of the second present receiver will next be described with reference to FIG. 3. FIG. 3A is a timing chart showing the operation of the second present receiver, and FIG. 3B is a timing chart in which one slot time of the timing chart shown in FIG. 3A is enlarged.

It is herein assumed that the value preset in the saving counter 3 is "106". The value of "106" is set instead of "108", because the start time of the circuit or the like is considered.

The slow clock signals (TECLK of FIG. 3B) outputted from the slow clock generating means 1 are counted (SAVESUBCNT of FIG. 3B) by the slot counter 21 of the averaging means 2, and divided by the decoders 22.

Additionally, values "D9h" and "DAh" are set in the decoders 22 of the averaging means 2, respectively.

Subsequently, the selector 23 alternately selects the divided clock signals transmitted from the first and second decoders 22 to average the signals and output the slot timing signals (SAVECLK of FIG. 3B). The slot timing signal is a pulse signal which rises only once in one slot time and which has a deviation of about three symbol time from the slot start point.

Then, upon receiving the slot timing signal, the output of the first OR gate 6 rises, and the slot counter 21 of the averaging means 2 is reset.

Moreover, upon receiving the slot timing signal, the saving counter 3 increments the counted value (counted value of FIG. 3A), and outputs a coincidence signal when the counted value reaches the preset value of "106".

Subsequently, the receiving means 4 receives the coincidence signal to start.

When SW detector 41 of the receiving means 4 detects SW, the slot counter 42 of the receiving means 4 measures one slot time from the time of the detection, and the receiving means 4 performs reception.

Furthermore, the slot counter 42 outputs the end timing signal (SUBFCLK of FIG. 3B) at a time when the reception is completed.

The intermittent frame synchronization is realized in this manner.

Moreover, when MPU 51 completes processing (when there is no processing to be performed), the stop order is transmitted to the clear register 52 to bring about a stop state (STANDBY of FIG. 3A).

On the other hand, the clear register 52 outputs the reset signal after a constant time elapses.

Then, NAND circuit 53 and the flip-flop circuit 54 cooperate to output a rapid clock control signal of "0".

Since the return factor generation signal is also in the state of "0", the second OR gate 7 also outputs a signal of "0", SO that the rapid clock generating means 9 outputs no clock signal.

Subsequently, at a time when the saving counter 3 outputs the coincidence signal, the coincidence signal is transmitted to the input terminal T of the flip-flop circuit 54. Then, the flip-flop circuit 54 reverses the output Q to output the rapid clock control signal of "1".

Then, the signal outputted from the second OR gate 7 becomes "1", and the rapid clock generating means 9 is ready to output the clock signal (ACTIVE of FIG. 3A).

Moreover, after the delay circuit 8 receives the rapid clock control signal of "1" and the constant time elapses, the interrupt signal MPUINT is transmitted to MPU 51 of the control means 5.

The MPU 51 then resumes its operation.

According to the second present receiver, the intermittent reception timing can be generated with high accuracy using the slow clock which can also be used for measuring time. Moreover, the control means is operated only before and after the slot to be received, and at other times, the operation of the control means can be stopped, so that the power consumption and cost can effectively be reduced.

A portable remote terminal according to the third embodiment of the present invention (the present portable remote terminal) will next be described.

The aforementioned first or second present receiver is applied to the present portable remote terminal, which can be applied to either PDC or PHS communication system. The reception is intermittently performed without using an exclusive crystal oscillator. Additionally, when the control means for controlling the receiver performs no processing, the generation of the clock signal to be supplied to the control means is temporarily stopped, so that the power consumption and manufacture cost can be reduced.

Figure 4:
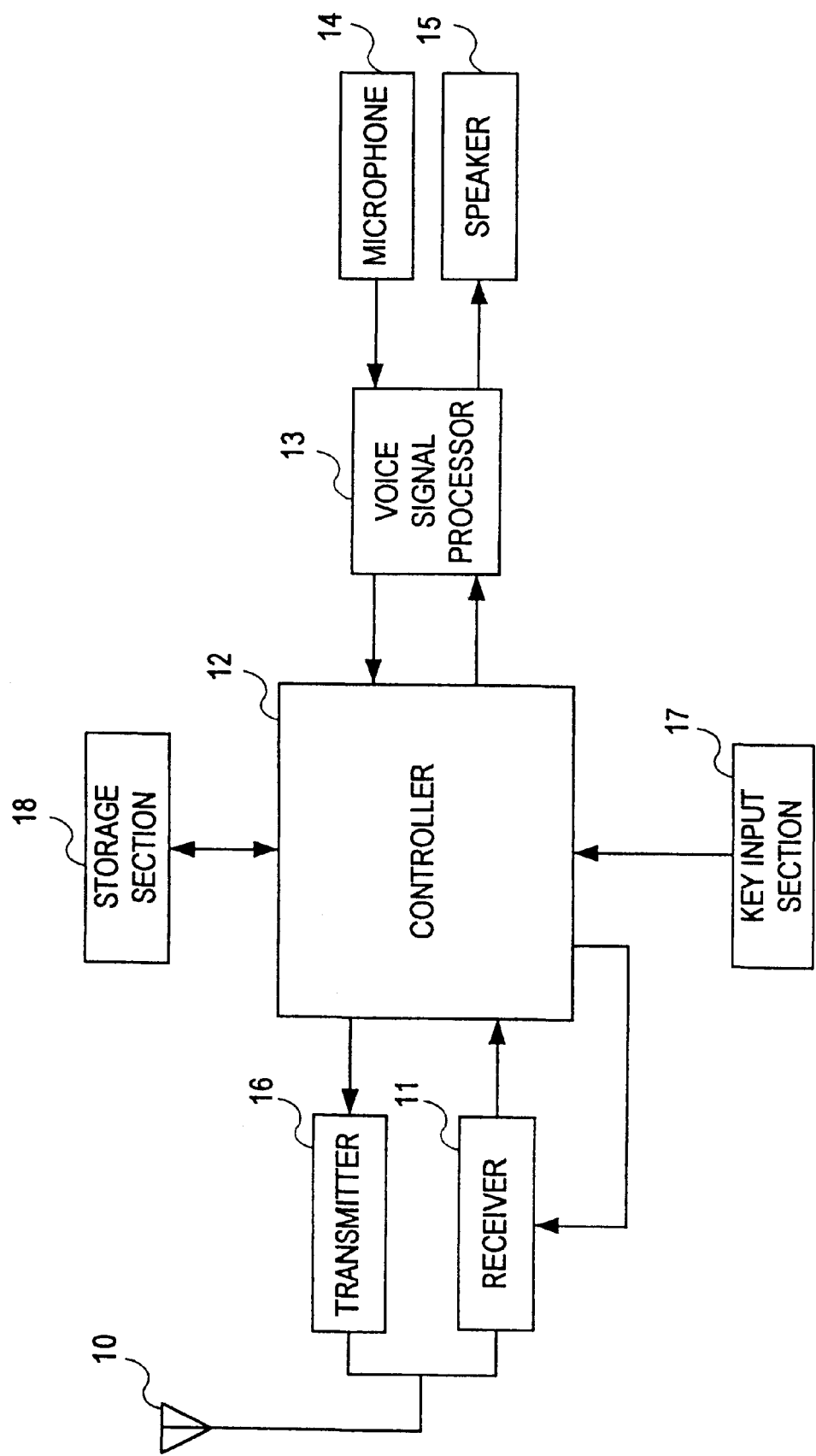
FIG. 4 is a block diagram diagrammatically showing the structure of a portable remote terminal according to the third embodiment of the present invention (the present portable remote terminal).

The general structure of the present portable remote terminal will first be described with reference to FIG. 4. FIG. 4 is a block diagram diagrammatically showing the structure of the portable remote terminal according to the third embodiment of the present invention (the present portable remote terminal).

As shown in FIG. 4, the basic structure of the portable remote terminal according to the third embodiment of the present invention (the present portable remote terminal) is substantially the same as that of the conventional portable remote terminal. The present portable remote terminal comprises an antenna 10 for performing transmission/reception of radio signals; a transmitter 16 for modulating and transmitting transmission data to the antenna 10; a receiver 11 for demodulating the signals received by the antenna 10; a controller 12 for encoding transmitted signals, decoding received signals and controlling the entire device; a voice signal processor 13 for converting voice and digital data; a microphone 14 for inputting the voice; a speaker 15 for outputting the voice; a key input section 17 provided with operation keys; and a storage section 18 for storing a processing program. The characteristic of the present portable remote terminal lies in the structure and operation of the receiver 11.

The characteristic receiver 11 of the present portable remote terminal can be applied not only to the above-mentioned PDC system but also to PHS (Personal Handy Phone System). The receiver 11 selects the communication system in accordance with the selection signal transmitted from the key input section 17 via the controller 12 and sets the data corresponding to the selected system in each constituting section to perform intermittent reception. The receiver 11 will be described later in more detail with reference to FIG. 5.

Moreover, the controller 12 performs signal processing associated with talking in the conventional manner, and further performs processing in accordance with the input signal from the key input section 17. Furthermore, in the present portable remote terminal, in a case of input of a selection signal for switching and selecting PDC and PHS, the selection signal is transmitted to the receiver 11.

During talking, the present portable remote terminal is operated in the same manner as the conventional portable remote terminal. At a time of transmission, the voice entered via the microphone 14 is analog/digital converted in the voice signal processor 13 and transmitted to the controller 12. The voice is further converted to a transmission format and encoded in the controller 12, demodulated in the transmitter 16, and transmitted as a radio signal via the antenna 10.

Moreover, at a time of reception, the signal received by the antenna 10 is demodulated in the receiver 11, decoded in the controller 12, further converted to a signal format inside the portable remote terminal, digital/analog converted in the voice signal processor 13, and outputted via the speaker 15.

During non-talking (at a time of waiting), the present portable remote terminal performs intermittent reception to achieve a reduction of power consumption.

Figure 5:
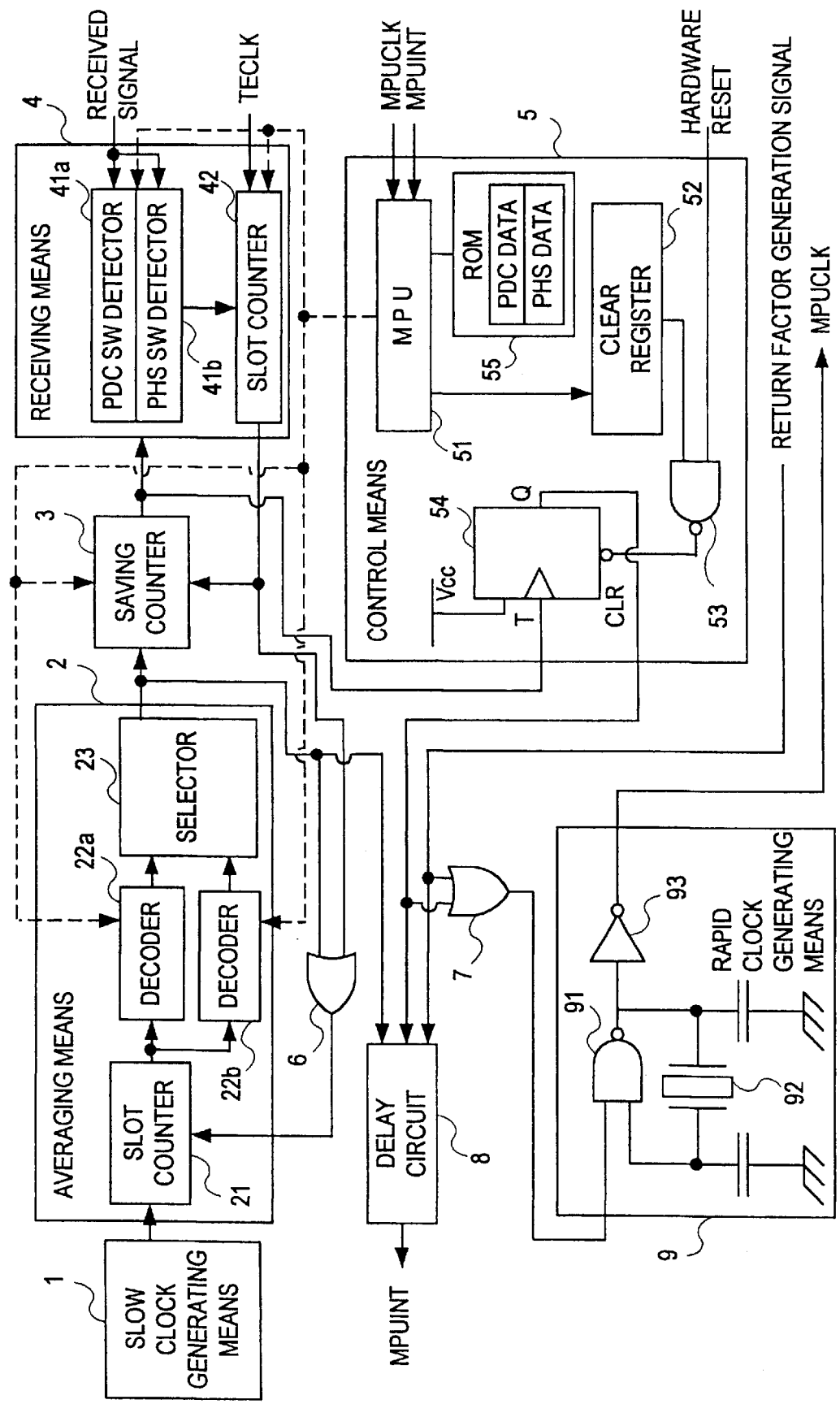
FIG. 5 is a block diagram showing the structure of a receiver of the portable remote terminal according to the third embodiment (the present portable remote terminal).

The structure of the characteristic receiver 11 of the present portable remote terminal will next be described in detail with reference to FIG. 5. FIG. 5 is a block diagram showing the structure of the receiver 11 of the portable remote terminal according to the third embodiment (the present portable remote terminal). Additionally, the same constituting sections as those in FIGS. 1 and 2 are described using the same reference numerals.

As shown in FIG. 5, the basic structure of the receiver 11 is substantially the same as that of the second present receiver shown in FIG. 2. The receiver 11 comprises a slow clock generating means 1, an averaging means 2, a saving counter 3, a control means 5, a first OR gate 6, a second OR gate 7, a delay circuit 8, and a rapid clock generating means 9.

Among these constituting sections, the slow clock generating means 1, the saving counter 3, the first OR gate 6, the second OR gate 7, the delay circuit 8 and the rapid clock generating means 9 are the same as those of the second present receiver, and are operated in the same manner. The structure and operation of the averaging means 2, the control means 5 and the receiving means 4 are partially different from those of the second present receiver.

First, the decoders 22a and 22b of the averaging means 2 are operated in accordance with the decoder values set by MPU 51 of the control means 5. The decoders emit pulse signals when the counted values transmitted from the slot counter 21 coincide with the decoder values set by MPU 51. Here, the decoder values of the decoders 22a and 22b are usually different from each other.

Moreover, in addition to a clear register 52, NAND circuit 53 and a flip-flop circuit 54 the same as those of the second present receiver, the characteristic control means 5 of the present portable remote terminal comprises MPU 51 for setting data in each constituting section of the receiver 11 and ROM 55 for storing data.

Sets of data set for PDC and PHS are stored in ROM 55. The set data comprises the decoder values set in the decoders 22a and 22b, the counted value of the saving counter 3 and the counted value set in the slot counter 42.

Furthermore, MPU 51 is provided with a system storage area (not shown) for storing whether the present selected system is PDC or PHS.

Moreover, the receiving means 4 is provided with PDC SW detector 41a for detecting SW from the received signal in PDC system, PHS SW detector 41b for detecting SW from the received signal in PHS, and a slot counter 42. In accordance with an instruction from MPU 51 of the control means 5, either the PDC SW detector 41a or the PHS SW detector 41b is operated.

Additionally, one slot time corresponding to PDC or PHS is set in the slot counter 42 by MPU 51.

The operation of the present portable remote terminal will next be described.

Upon receiving the selection signal from the key input section 17 via the controller 12, MPU 51 updates the system (PDC or PHS) stored in the system storage area to the selected system, reads the data corresponding to the system newly selected from ROM 55, and sets the data in the decoders 22a and 22b of the averaging means 2, the saving counter 3 and the slot counter 42. Additionally, the MPU selects and operates the SW detector 41 corresponding to the selected system from two SW detectors of the receiving means.

Additionally, the operation of the other constituting sections are the same as the operation of the second present receiver shown in FIG. 2. Specifically, the intermittent reception is performed. In a case where there is no processing, the generation of the rapid clock and the operation of MPU 51 are stopped.

In the present portable remote terminal, the decoders 22a, 22b, the saving counter 3 and the slot counter 42 are operated using the values corresponding to the communication system selected from PDC and PHS. Moreover, the SW detector 41a or 41b corresponding to the selected system is operated to appropriately detect SW, so that the intermittent frame synchronization corresponding to PDC or PHS is performed.

Additionally, in the embodiment, the intermittent reception in the receiver 11 is controlled by MPU 51 disposed inside the receiver 11, but the controller 12 shown in FIG. 4 may be provided with a part of the receiver 11, e.g., the control means 5 and the rapid clock generating means 9. Furthermore, the controller 12 may be provided with the constituting sections of the receiver excluding the receiving means 4.

Specific examples of PDC and PHS data stored in ROM 55 will next be described with reference to Tables 1 to 4.

In PDC system, one subframe time is 6.6666667 ms, a symbol rate is 21 ksps (symbol per sec), and an intermittent reception interval is 720 ms. In PHS, one frame time is 5 ms, the symbol rate is 192 ksps, and the intermittent reception interval is 1.2 second.

The data stored in ROM 55 contains the counted values of the decoders 22a, 22b, the counted value of the saving counter 3, and the counted value of the slot counter 42. Additionally, the value set in the slot counter 42 is equivalent to one slot time, 6.6666667 ms in PDC system and 5 ms in PHS, and the description thereof is omitted herein. In the embodiment, two decoders are used, but three or more decoders may be used. Therefore, Table 1 or 3 shows a case where two decoders are used, while Table 2 or 4 shows a case where three decoders are used.

For PDC data, Table 1 shows a decoder interval, a timer time, a time deviation and a symbol deviation, when the counted value of decoder 1 is set to 219, the counted value of decoder 2 is set to 218, and the counted value of the saving counter is set to 108.

TABLE 1

| DECODER 1 | 219 |
|---|---|
| DECODER 2 | 218 |
| SAVING COUNTER VALUE | 108 |
| DECODER INTERVAL (ms) | 6.683350 |
| TIMER TIME (s) | 0.720154 |
| TIME DEVIATION ($\mu$s) | 153.81 |
| SYMBOL DEVIATION (SYMBOL) | 3.23 |

For PDC data, Table 2 shows a decoder interval, a timer time, a time deviation and a symbol deviation, when the counted value of decoder 1 is set to 226, the counted value of decoder 2 is set to 224, and the counted value of decoder 3 is set to 224, and the counted value of the saving counter is set to 105.

TABLE 2

| DECODER 1 | 226 |
|---|---|
| DECODER 2 | 224 |
| DECODER 3 | 224 |
| SAVING COUNTER VALUE | 105 |
| DECODER INTERVAL (ms) | 6.896973 |
| TIMER TIME (s) | 0.719910 |
| TIME DEVIATION ($\mu$s) | −90.33 |
| SYMBOL DEVIATION (SYMBOL) | −1.90 |

For PHS data, Table 3 shows a decoder interval, a timer time, a time deviation and a symbol deviation, when the counted value of decoder 1 is set to 165, the counted value of decoder 2 is set to 164, and the counted value of the saving counter is set to 239.

TABLE 3

| DECODER 1 | 165 |
|---|---|
| DECODER 2 | 164 |
| SAVING COUNTER VALUE | 239 |
| DECODER INTERVAL (ms) | 5.0354004 |
| TIMER TIME (s) | 1.1998291 |
| TIME DEVIATION ($\mu$s) | −170.8984 |
| SYMBOL DEVIATION | −32.81 |

For PHS data, Table 4 shows a decoder interval, a timer time, a time deviation and a symbol deviation, when the counted value of decoder 1 is set to 20, the counted value of decoder 2 is set to 20, the counted value of decoder 3 is set to 21, and the counted value of the saving counter is 1934.

TABLE 4

| DECODER 1 | 20 |
|---|---|
| DECODER 2 | 20 |
| DECODER 3 | 21 |
| SAVING COUNTER VALUE | 1934 |
| DECODER INTERVAL (ms) | 0.610352 |
| TIMER TIME (s) | 1.200073 |
| TIME DEVIATION ($\mu$s) | 73.24 |
| SYMBOL DEVIATION | 14.06 |

For the above set values, the interval with which conversion is performed in the decoder is usually around 5 ms, because the time of rising of the rapid clock needs to be considered. Therefore, the decoder interval has to be around 5 ms. In PDC system, the decoder interval is preferably close to the subframe time, if possible. In PHS, the frame time is appropriate.

The deviation time needs to be (approximately) level as long as no synchronizing error occurs in capture of sync words during the intermittent reception. However, the degree of deviation causing the synchronizing error is attributed to the way of constructing the system. Therefore, for example, the deviation time in the intermittent frame control is inversely counted beforehand including a deviation in frequency. Then, the start of the counter for intermittent reception according to the embodiment is inversely counted and deviated, so that no problem occurs.

According to the present invention, the portable remote terminal of the third embodiment (the present portable remote terminal) is provided with the second present receiver. Furthermore, the decoder values of the decoders 22a and 22b corresponding to PDC and PHS and the counted values of the saving counter 3 and the slot counter 42 are pre-stored in ROM 55. Moreover, the receiving means 4 is provided with PDC SW detector 41a and PHS SW detector 41b. The MPU 51 of the control means 5 reads from ROM 55 the data corresponding to the selected system in response to the input from the outside, sets the data in the decoders 22a, 22b, the saving counter 3 and the slot counter 42, and selects and operates SW detector 41 corresponding to the selected system. Therefore, the intermittent reception timing corresponding to PDC or PHS can be generated with high accuracy using the slow clock which can also be used for measuring time. Additionally, the control means 5 is operated only before and after the slot to be received, and the operation of the control means 5 is stopped at other times, so that the power consumption and cost can effectively be reduced.

Furthermore, for digital communication systems other than PDC and PHS, by pre-storing the decoder values of the decoders 22a and 22b corresponding to the relevant system, the set value of the saving counter 3 and the set value of the slot counter 42 and by providing SW detector corresponding to the relevant system, intermittent frame synchronization can be performed in the same manner as in PDC and PHS, which can provide the same effect.

According to the present invention, the averaging means divides clock signals oscillated in arbitrary periods with separate periods and averages the divided clock signals to generate slot timing signals, and the saving counter counts the slot timing signals. When the counted value coincides with the preset value, the coincidence signal is emitted. Upon receiving the coincidence signal, the receiving means perform reception only for one slot time. In the receiver, the clock signal for realizing battery saving can be shared with other clock signals, so that the power consumption and cost can effectively be reduced. Furthermore, by using the averaging means, the accuracy of the intermittent reception timing can effectively be maintained.

According to the present invention, the averaging means comprises the slot counter for incrementing the counted value every time the clock signal is received; the first decoder for comparing the counted value with the first preset value to output the pulse signal indicative of coincidence when the values coincide with each other; the second decoder for comparing the counted value with the second preset value to output the pulse signal indicative of coincidence when the values coincide with each other; and the selector for alternately selecting the pulse signals emitted from the first and second decoders and transmitting to the outside the slot timing signal to form the pulse signal which rises in one slot time. In the receiver, the clock signal for realizing battery saving can be shared with other clock signals, so that the power consumption and cost can effectively be reduced. Moreover, by averaging the clock signals divided with separate periods, the accuracy of the intermittent reception timing can effectively be enhanced.

According to the receiver of the present invention, the clock for measuring time outputs clock signals. Therefore, the clock signal for realizing battery saving can be shared with the clock signal for measuring time, so that the power consumption and cost can effectively be reduced, while the accuracy of the intermittent reception timing can effectively be maintained.

According to the present invention, the clock signals transmitted from the time measuring clock are divided with separate periods, the divided clock signals are averaged to generate slot timing signals, and the slot timing signals are counted. When the preset constant number is reached, reception is performed only for one slot time. In the intermittent frame synchronizing method, the clock signal for realizing battery saving can be shared with the clock signal for measuring time, so that the power consumption and cost can effectively be reduced. By averaging the clock signals divided with separate periods, the accuracy of the intermittent reception timing can effectively be maintained.

According to the present invention, the averaging means generates the slot timing signals from the clock signals transmitted from the slow clock generating means, the saving counter counts the slot timing signals and outputs the coincidence signal when the preset value is reached, the receiving means performs reception only for one slot time after the coincidence signal is outputted, and the control means is provided with MPU which is stopped when there is no processing to be performed and which receives the interrupt signal to resume processing. When MPU is stopped, the rapid clock control signal for stopping the generation of the rapid clock is outputted. The rapid clock signal generating section stops generating clock signals upon receiving the rapid clock control signal for stopping the generation of rapid clock, but starts generating clock signals upon receiving the coincidence signal. On the other hand, the delay circuit transmits the interrupt signal to MPU when the constant time elapses after the coincidence signal is received. In the receiver, the clock signal for realizing battery saving can be shared with other clock signals. When there is no processing to be performed, the supply of clock signals to MPU can be stopped, so that the power consumption and cost can effectively be reduced. By using the averaging means, the accuracy of the intermittent reception timing can effectively be maintained.

According to the present invention, since the portable remote terminal is provided with the receiver disclosed above, the clock signal for realizing battery saving can be shared with other clock signals in the portable remote terminal. Therefore, the power consumption and cost can effectively be reduced. Moreover, by using the averaging means, the accuracy of the intermittent reception timing can effectively be maintained.

According to the present invention, since the portable remote terminal is provided with the receiver disclosed above, the clock signal for realizing battery saving can be shared with other clock signals in the portable remote terminal. Therefore, the power consumption and cost can effectively be reduced. Moreover, by averaging the clock signals divided with separate periods, the accuracy of the intermittent reception timing can effectively be enhanced.

According to the present invention, in the portable remote terminal provided with the receiver disclosed above, the clock signal for realizing battery saving can be shared with the clock signal for measuring time, so that the power consumption and cost can effectively be reduced, while the accuracy of the intermittent reception timing can effectively be maintained.

According to the present invention, since the portable remote terminal is provided with the receiver disclosed above, the clock signal for realizing battery saving can be shared with other clock signals. Additionally, while there is no processing to be performed, the supply of clock signals to MPU can be stopped, so that the power consumption and cost can effectively be reduced. By using the averaging means, the accuracy of the intermittent reception timing can effectively be maintained.

According to the present invention, the averaging means generates the slot timing signals from the clock signals transmitted from the slow clock generating means, the saving counter counts the slot timing signals and outputs the coincidence signal when the preset value is reached, the receiving means performs reception only for the preset one slot time after the coincidence signal is outputted, and the control means is provided with MPU which is stopped when there is no processing to be performed and which resumes processing upon receiving the interrupt signal. When MPU is stopped, the rapid clock control signal for stopping the generation of the rapid clock is outputted. The rapid clock signal generating section stops generating clock signals upon receiving the rapid clock control signal for stopping the generation of the rapid clock, but starts generating clock signals upon receiving the coincidence signal. On the other hand, the delay circuit transmits the interrupt signal to MPU when the constant time elapses after the coincidence signal is received. The averaging means is provided with the slot counter which increments the counted value every time the clock signal is received, the first decoder which compares the counted value with the preset first value and outputs the pulse signal indicative of coincidence upon coincidence, the second decoder which compares the counted value with the preset second value and outputs the pulse signal indicative of coincidence upon coincidence, and the selector for alternately selecting the pulse signals transmitted from the first and second decoders and transmitting to the outside the slot timing signal to form the pulse signal which rises once in one slot time. In the receiver, the clock signal for realizing battery saving can be shared with other clock signals. When there is no processing to be performed, the supply of clock signals to MPU can be stopped, so that the power consumption and cost can effectively be reduced. By averaging the clock signals divided with separate periods, the accuracy of the intermittent reception timing can effectively be enhanced.

According to the present invention, a plurality of SW detectors are provided corresponding to a plurality of communication systems. The control means is provided with the storage section for storing sets of data to be set in the first and second decoders, the saving counter and the slot counter corresponding to the plurality of communication systems. Based on the signal transmitted from the outside for selecting the communication system, MPU refers to the storage section to select the set of data corresponding to the selected communication system, sets the data contained in the set in the first and second decoders, the saving counter and the slot counter, and selects and operates SW detector corresponding to the selected communication system from the plurality of SW detectors. In the receiver, by generating the intermittent reception timing corresponding to the communication system selected from the plurality of communication systems, the signals of the plurality of communication systems can be intermittently received by one receiver. Therefore, the power consumption and cost can be reduced. Furthermore, handiness can effectively be enhanced.

According to the present invention, in the portable remote terminal provided with the receiver disclosed above, by generating the intermittent reception timing corresponding to the communication system selected from the plurality of communication systems, the signals of the plurality of communication systems can be intermittently received by one receiver. Therefore, the power consumption and cost can be reduced, while handiness can effectively be enhanced.

According to the present invention, the communication systems include a personal digital cellular (PDC) system and a personal handy phone system (PHS). In the portable remote terminal of the invention, the signals of both PDC and PHS can be intermittently received by one portable remote terminal, so that the power consumption and cost can be reduced, while handiness can further be enhanced.

What is claimed is:

1. A receiver which comprises a slow clock generating means for outputting clock signals; an averaging means for dividing the clock signals transmitted from said slow clock generating means with separate periods, averaging said divided clock signals and outputting a slot timing signal to form a pulse signal which rises once in one slot time; a saving counter for incrementing a counted value every time said slot timing signal is received and outputting a coincidence signal indicative of coincidence when said counted value coincides with the preset value; and a receiving means for performing reception only for one slot time after said coincidence signal is received.

2. The receiver according to claim 1 wherein the averaging means comprises:

a slot counter for incrementing the counted value every time the clock signal is received from the slow clock generating means;

a first decoder for comparing the counted value of said slot counter with the first preset value and outputting a pulse signal indicative of coincidence upon coincidence;

a second decoder for comparing the counted value of said slot counter with the second preset value and outputting a pulse signal indicative of coincidence upon coincidence; and a selector for alternately selecting the pulse signals transmitted by said first decoder and said second decoder and transmitting to the outside the slot timing signal to form the pulse signal which rises once in one slot time.

3. The receiver according to claim 1 which comprises a time measuring clock, said slow clock generating means being said time measuring clock.

4. An intermittent frame synchronizing method which comprises the steps of dividing clock signals transmitted from a time measuring clock with separate periods, averaging the divided clock signals, generating slot timing signals to form one pulse signal per slot time, counting said slot timing signals, and performing reception only for one slot time every time the preset constant number is reached.

5. A receiver which comprises:

a slow clock generating means for outputting clock signals;

an averaging means for generating slot timing signals from said clock signals to form a pulse signal which rises once in one slot time;

a saving counter for counting said slot timing signals and outputting a coincidence signal when the preset value is counted;

a receiving means for performing reception only for one slot time after said coincidence signal is outputted;

a control means provided with MPU which is stopped when there is no processing to be performed and restarts processing upon receiving an interrupt signal, and outputting a rapid clock control signal for stopping the generation of a rapid clock when said MPU is stopped;

a delay circuit for transmitting the interrupt signal to said MPU when the preset constant time elapses after the coincidence signal is received from said saving counter; and a rapid clock generating means for receiving the rapid clock control signal for stopping the generation of said rapid clock to stop the generation of the rapid clock and for receiving the coincidence signal from said saving counter to start the generation of the rapid clock.

6. The portable remote terminal which comprises a receiver for receiving a radio signal and demodulating a received radio signal to a received digital signal; a transmitter for modulating a digital signal to transmit a radio signal; a controller for processing said received digital signal; a voice processor for performing conversion of said digital signal to a voice signal; a voice output section for outputting a voice; and a voice input section for inputting a voice, said receiver being the receiver as claimed in claim 1.

7. The portable remote terminal which comprises a receiver for receiving a radio signal and demodulating a received radio signal to a received digital signal; a transmitter for modulating a digital signal to transmit a radio signal; a controller for processing said received digital signal; a voice processor for performing conversion of said digital signal to a voice signal; a voice output section for outputting a voice; and a voice input section for inputting a voice, said receiver being the receiver as claimed in claim 2.

8. The portable remote terminal which comprises a receiver for receiving a radio signal and demodulating a received radio signal to a received digital signal; a transmitter for modulating a digital signal to transmit a radio signal; a controller for processing said received digital signal; a voice processor for performing conversion of said digital signal to a voice signal; a voice output section for outputting a voice; and a voice input section for inputting a voice, said receiver being the receiver as claimed in claim 3.

9. The portable remote terminal which comprises a receiver for receiving a radio signal and demodulating a received radio signal to a received digital signal; a transmitter for modulating a digital signal to transmit a radio signal; a controller for processing said received digital signal; a voice processor for performing conversion of said digital signal to a voice signal; a voice output section for outputting a voice; and a voice input section for inputting a voice, said receiver being the receiver as claimed in claim 5.

10. A receiver which comprises:
- a slow clock generating means for outputting clock signals;
- an averaging means for generating slot timing signals from said clock signals to form a pulse signal which rises once in one slot time;
- a saving counter for counting said slot timing signals and outputting a coincidence signal when the preset value is counted;
- a receiving means for performing reception only for the preset one slot time after said coincidence signal is outputted;
- a control means provided with MPU which is stopped when there is no processing to be performed and restarts processing upon receiving an interrupt signal, and outputting a rapid clock control signal for stopping the generation of a rapid clock when said MPU is stopped;
- a delay circuit for transmitting the interrupt signal to said MPU when the preset constant time elapses after the coincidence signal is received from said saving counter; and
- a rapid clock generating means for receiving the rapid clock control signal for stopping the generation of said rapid clock to stop the generation of the rapid clock and receiving the coincidence signal from said saving counter to start the generation of the rapid clock, said averaging means comprising:
- a slot counter for incrementing the counted value every time the clock signal is received from said slow clock generating means;
- a first decoder for comparing the counted value of said slot counter with the first preset value and outputting a pulse signal indicative of coincidence upon coincidence;
- a second decoder for comparing the counted value of said slot counter with the second preset value and outputting a pulse signal indicative of coincidence upon coincidence; and
- a selector for alternately selecting the pulse signals outputted by said first decoder and said second decoder and transmitting to the outside the slot timing signal to form the pulse signal which rises once in one slot time, said receiving means comprising:
- a SW detector for detecting a sync word from the received signal and outputting a pulse signal indicating that said sync word is detected; and
- a slot counter for receiving said pulse signal from said SW detector and measuring said preset one slot time before outputting an end timing signal.

11. The receiver according to claim 10 wherein a plurality of SW detectors are provided corresponding to a plurality of communication systems,
- the control means comprises a storage section for storing sets of data to be set in the first decoder, the second decoder, the saving counter and the slot counter corresponding to said plurality of communication systems,
- the MPU refers to said storage section based on a signal transmitted from the outside for selecting the communication system to select the set of data corresponding to said selected communication system, and sets the data included in said set to said first decoder, said second decoder, said saving counter and said slot counter, and selects and operates the SW detector corresponding to said selected communication system from said plurality of SW detectors.

12. The portable remote terminal which comprises a receiver for receiving a radio signal and demodulating a received radio signal to a received digital signal; a transmitter for modulating a digital signal to transmit a radio signal; a controller for processing said received digital signal; a voice processor for performing conversion of said digital signal to a voice signal; a voice output section for outputting a voice; and a voice input section for inputting a voice, said receiver being the receiver as claimed in claim 11.

13. The portable remote terminal according to claim 12 wherein the plurality of communication systems include a personal digital cellular system and a personal handy phone system.

* * * * *